United States Patent
Klassen et al.

(10) Patent No.: US 6,387,152 B1
(45) Date of Patent: May 14, 2002

(54) PROCESS FOR MANUFACTURING NANOCRYSTALLINE METAL HYDRIDES

(75) Inventors: Thomas Klassen, Hamburg; Wolfgang Oelerich, Geesthacht; Rüdiger Bormann, Hamburg; Volker Güther, Burgthann, all of (DE)

(73) Assignee: GKSS Forschungszentrum Geesthacht GmbH, Geesthacht (DE)

(*) Notice: Subject to any disclaimer, the term of this patent is extended or adjusted under 35 U.S.C. 154(b) by 0 days.

(21) Appl. No.: 09/593,339

(22) Filed: Jun. 14, 2000

Related U.S. Application Data

(63) Continuation-in-part of application No. PCT/DE98/03765, filed on Dec. 23, 1998.

(30) Foreign Application Priority Data

Dec. 23, 1997 (DE) .......................................... 197 58 384

(51) Int. Cl.$^7$ ................................................ C01B 6/24
(52) U.S. Cl. ........................... 75/352; 75/354; 423/644; 423/645; 423/646
(58) Field of Search ................... 75/352, 354; 423/644, 423/645, 646

(56) References Cited

U.S. PATENT DOCUMENTS

| | | | | |
|---|---|---|---|---|
| 5,147,449 A | * | 9/1992 | Grewe et al. .................. | 75/354 |
| 5,837,030 A | * | 11/1998 | Schultz et al. ................ | 75/352 |
| 5,951,739 A | * | 9/1999 | Klapdor et al. ................ | 75/371 |
| 5,964,965 A | * | 10/1999 | Schultz et al. ............. | 148/420 |
| 6,231,636 B1 | * | 5/2001 | Froes et al. .................... | 75/352 |
| 6,251,349 B1 | * | 6/2001 | Zaluska et al. ............. | 423/644 |

FOREIGN PATENT DOCUMENTS

WO 99/33747 * 7/1999

* cited by examiner

*Primary Examiner*—George Wyszomierski
(74) *Attorney, Agent, or Firm*—Klaus J. Bach

(57) ABSTRACT

In a process of producing nanocrystalline metal hydrides, an elemental metal hydride of a first kind is subjected to a mechanical milling process with at least one elemental metal or at least one additional metal hydride to produce an alloy hydride.

8 Claims, 7 Drawing Sheets

PROCESS FOR MANUFACTURING NANOCRYSTALLINE METAL HYDRIDES

This is a continuation-in-part application of international application PCT/DE98/03765 filed Dec. 23, 1998 and claiming the priority of German application No. 197 58 384.9 filed Dec. 23, 1997.

BACKGROUND OF THE INVENTION

The invention relates to a process of manufacturing nanocrystalline metal hydrides.

It is known that hydrogen storage devices, known as hydride storage devices, can be formed on the basis of reversible metal hydrides. This involves charging the storage device under release of heat, wherein hydrogen is bonded by chemisorption and is discharged again by the application of heat. Thus hydrogen storage devices could form outstandingly good energy storage devices for mobile and/or stationary applications, i.e. they should provide in the future considerable storage potential because no harmful emissions are generated during the discharge of the hydrogen storage device.

What are known as nanocrystalline hydrides are very suitable for this kind of hydride storage devices. These hydrides are characterized by rapid hydrogen assimilation and release kinetics. However, until now, their manufacture has been very complicated and expensive. Up to now, nanocrystalline alloys were manufactured firstly by high-energy grinding from elemental components or pre-alloys, with the grinding durations sometimes being very long. In a subsequent process step, these nanocrystalline alloys were subjected, where required, to a multi-stage heat treatment under a high hydrogen pressure to be hydrogenated in this manner. Furthermore, for many alloys, multiple charging and discharging with hydrogen is necessary in order to achieve full storage capacity.

Alternatively, attempts have been made to synthesize the corresponding hydrides by milling in an atmosphere of hydrogen or by purely chemical means. However, it was observed that the yield of the desired hydrides is relatively small and additional unwanted phases may sometimes appear.

Furthermore, certain phases are not even obtainable with these conventional methods.

It is the object of the present invention to provide a process of manufacturing metal hydrides, with which however stable and metastable hydrides or hydrides of metastable alloys can be obtained, particularly hydrides with a very high yield of up to 100%. The process should further be capable of being carried out under comparatively simply manageable conditions and should require a comparatively small input of energy.

SUMMARY OF THE INVENTION

In a process for manufacturing nanocrystalline metal hydrides, a metal hydrides of a first kind is subjected to a mechanical milling process with at least one elemental metal or at least one additional metal hydride to produce an alloy hydride.

The advantage of the process according to the invention lies essentially in the fact that the manufacture of stable and metastable hydrides or hydrides of metastable alloys is made possible in a comparatively simple way with a high yield of up at 100%. The disadvantages that occur in the processes known in the state of the art for manufacturing hydride storage devices are avoided. In addition, the process according to the invention permits the manufacture of hydrides that could not be manufactured at all using known processes.

Depending on the hydrides used to manufacture nanocrystalline metal hydrides, the milling process for the mixture of elemental metal hydride, metal or several additional metal hydrides is preferably carried out for a predetermined period, preferably in the range from 20 to 200 hours.

In principle, however the milling procedure period is dependent on the design of the milling equipment used, so that the specified and preferred milling times may not be reached or may be exceeded. However, in general, it can be said that the milling times according to the invention are significantly shorter than those employed during milling without the use of hydrides.

Milling under an inert gas atmosphere has been found to be advantageous. As already mentioned above, hydrides, for example magnesium-iron hydrides, were hitherto manufactured by annealing at high temperature under a high pressure of hydrogen. Remaining with this example, attempts were made to mill magnesium and iron in a hydrogen atmosphere, !but this did not lead to the generation of the desired magnesium-iron hydride. However, according to the invention, it is possible, by milling magnesium hydride and iron in a particular molar ratio under an inert gas atmosphere, to produce a hydrogen-enriched hydride directly at the end of the milling process, which has proved very successful especially when using argon as the inert gas.

Particularly good results were achieved with the process, when the first elemental metal hydride consisted of metals of the $I^{st}$ or $II^{nd}$ main group of the period system. The metals are preferably Li, Na, K, Mg, Ca, Sc, Y, Ti, V, Ny, or La, with the elements preferably being Fe, Co, Nb, Cu, Zn, Al and Si. Especially good process results were also achieved when the elemental metal consisted of elements of the VIIIth subgroup of the periodic system of elements.

Preferably, the second metal hydride consists of a mixture of elements of the $I^{st}$ and $III^{rd}$ main group of the periodic system of elements. Carrying out the process in such a way provides for very good results in the desired sense.

Basically, the process can also be carried out if the metal hydrides and/or the metal are not present in the form of powder at the beginning of the milling procedure. It is especially advantageous to first convert the metal hydride and/or the metal into powder form and then to subject the powdered metal hydride and/or the metal to the milling process according to the invention because the process can then be operated efficiently and consequently with an extremely high yield.

The invention will now be described in detail on the basis of several examples with reference to the following diagrammatic illustrations.

DESCRIPTION OF EXAMPLES

It is known that magnesium and iron are not miscible. The usual way of manufacturing hydrides employed for example heat treatment of the constituents, which was to provide the desired hydride. This step was performed at very high temperature and under a high pressure of hydrogen. Earlier experiments basically showed that the milling of magnesium and iron under an atmosphere of hydrogen however did not lead to a generation of, for example, a hydride in the form of $Mg_2FeH_6$. But these experiments had shown that milling the constituents basically made a reduction of the heat treatment temperature and of the hydrogen pressure possible.

In the process of the invention, elemental hydrides and elemental metal of the elements of the VIII$^{th}$ sub-group of the periodic system of the elements, for example, $MgH_2$ and Fe, are milled under an argon atmosphere. According to the invention, it has been found that, at the end of the milling procedure, it is possible to generate the resulting hydride $Mg_2FeH_6$ directly without subsequent annealing.

EXAMPLE 1

SYNTHESIS OF $Mg_2FeH_6$

Figure 1:
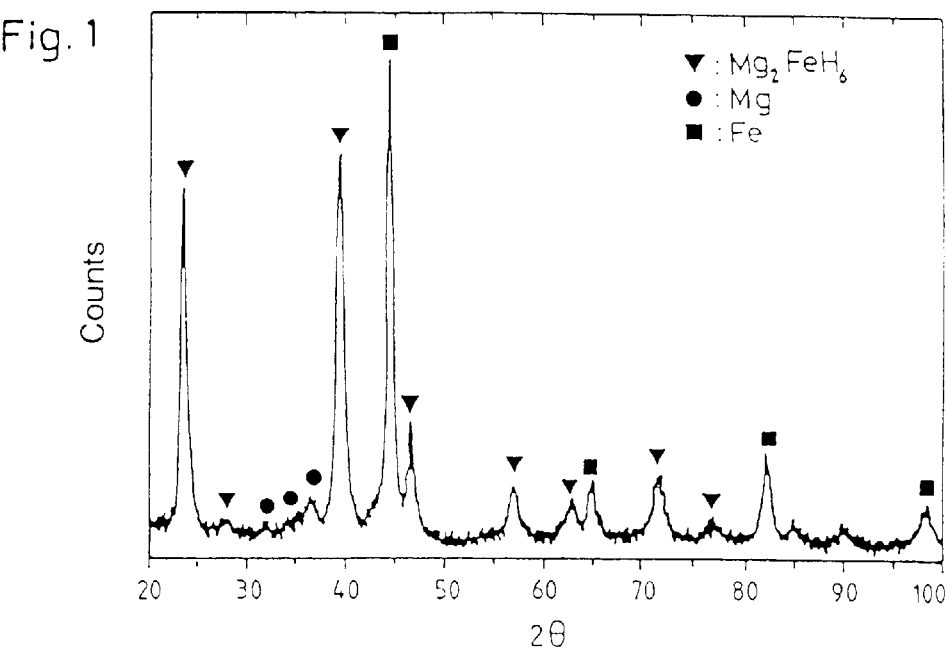
FIG. 1 shows the X-ray diffraction pattern of the $Mg_2FeH_6$ powder.
Figure 2:
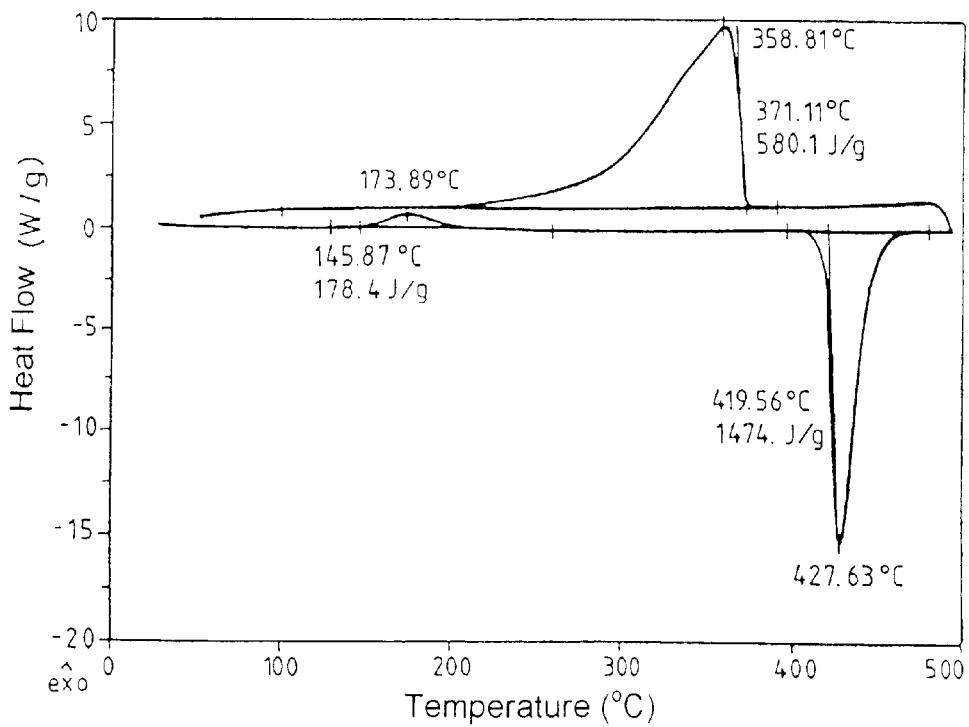
FIG. 2 indicates a confirmation of the results of example 1 by an examination using a differential scanning calorimeter, DSC, under hydrogen.

Experimental details: 3 g of Mg of $MgH_2$ and Fe in a molar ratio of 2:1 were put into a 60 ml cup together with 3 steel balls (two of 1.27 cm and one of 1.429 cm diameter). The powder was subjected to intense mechanical pulverizing in a high energy ball-milling machine of the type SPEX 8000 (SPEX is a registered trademark). The milling was carried out for 60 hours under an argon atmosphere. The x-ray diffraction pattern shown in FIG. 1 of the resulting $Mg_2FeH_6$ powder shows the hydride generated according to example 1. The result was confirmed by an examination using a differential scanning calorimeter, DSC, under hydrogen. The X-ray diffraction pattern of the powder according to example 1 shows for the $Mg_2FeH_6$ a crystal size of 22 nm.

EXAMPLE 2

SYNTHESIS OF $Na_3AlH_6$

Figure 3:
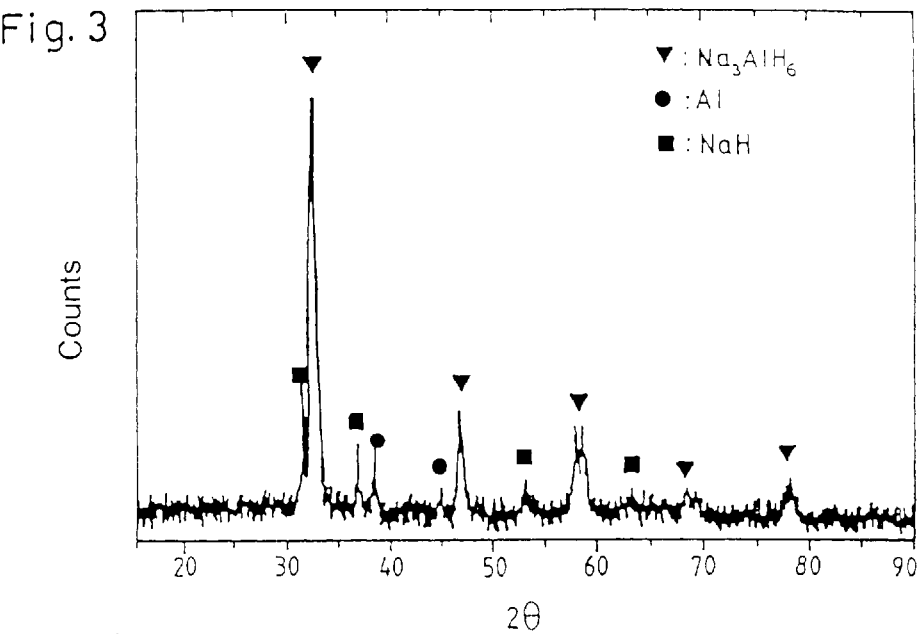
FIG. 3 shows the x-ray diffraction pattern of the $Na_2AlH_6$ powder.
Figure 4:
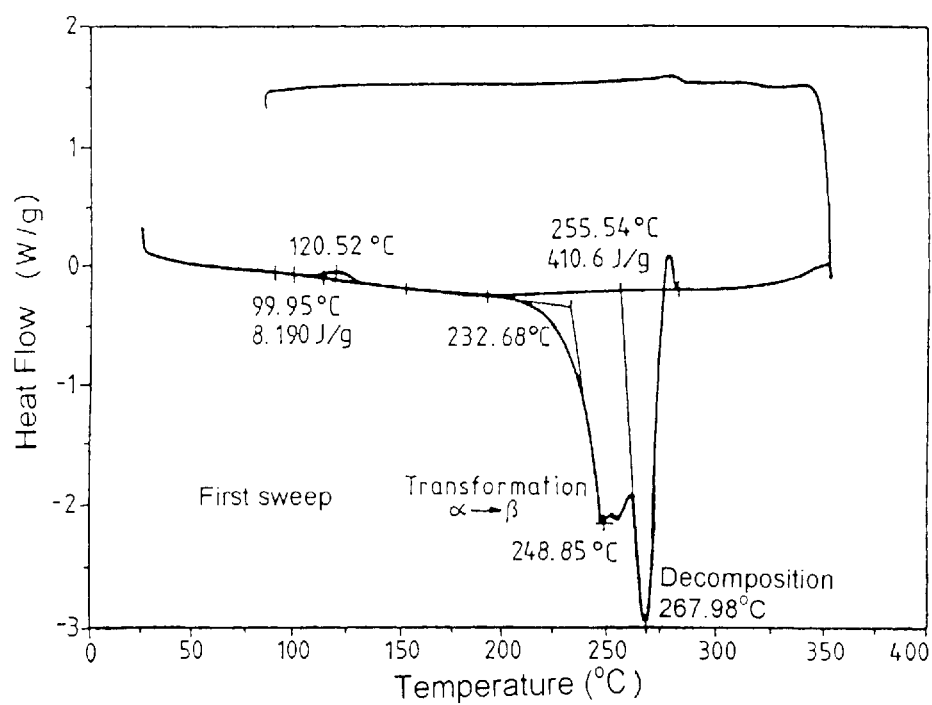
FIG. 4 provides a confirmation of the results of FIG. 3 by an examination using a differential scanning calorimeter, DSC, under hydrogen.

Experimental details: 3 g of NaH and $NaAlH_4$ in a molar ratio of 2 were put into a 60 ml cup together with 3 steel balls (two of 1.27 cm and one of 1.429 cm diameter). The powder was subjected to intense mechanical pulverizing in a high-energy milling machine of the type SPEX 8000. The milling was carried out for 20 hours under an argon atmosphere. The X-ray diffraction pattern of the powder illustrated in FIG. 3 shows the formation of $Na_3AlH_6$ according to Example 2. This result was confirmed by verification using a differential scanning calorimeter, DSC, under hydrogen, cf. FIG. 4.

EXAMPLE 3

SYNTHESIS OF $Na_2AlLiH_6$

Figure 5:
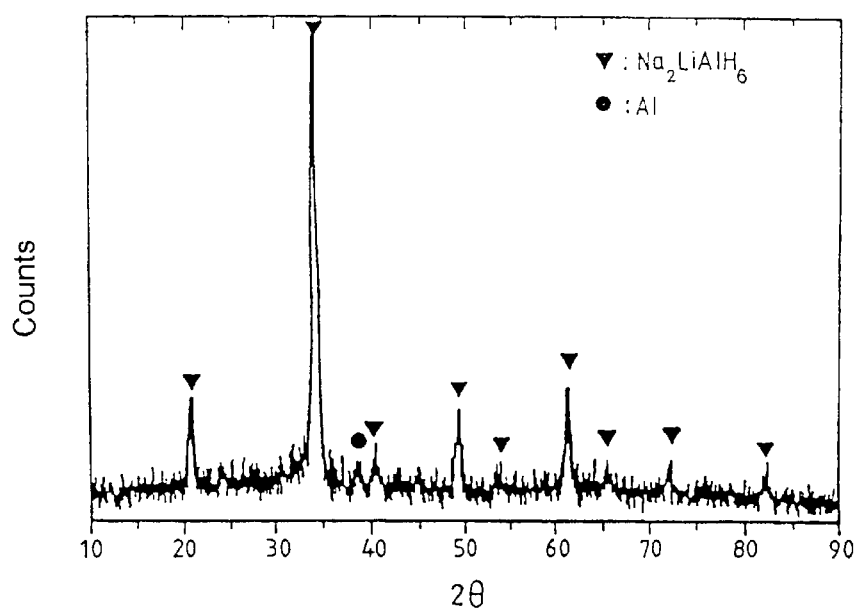
FIG. 5 shows the x-ray diffraction pattern of the $Na_2AlLiH_6$ powder.

Experimental details: 3 g of NaH, LiH and $NaAlH_4$ in a molar ratio of 1:1:1 were placed into a 60 ml cup together with 3 steel balls (two of 1.27 cm and one of 1.429 cm diameter). The powder was subjected to intense mechanical milling in a high energy ball-milling machine of the type SPEX 8000. The milling was carried out under an argon atmosphere for a period of 40 hours. The X-ray diffraction pattern of the powder illustrated in FIG. 5 shows the formation of the $Na_2AlLiH_6$ hydride.

EXAMPLE 4

SYNTHESIS OF $Mg_2NiH_4$

Experimental details: $MgH_2$ powder and elemental Ni powder were mixed in a molar ratio of 2:1. 40 g of this powder mixture was milled in a planetary ball mill (type Fritsch P5) at 230 rpm, using a hardened chrome steel cup (with a volume of 250 ml) and balls (with a diameter of mill experiments were carried out in a argon atmosphere for up to 200 hours.

Figure 6:
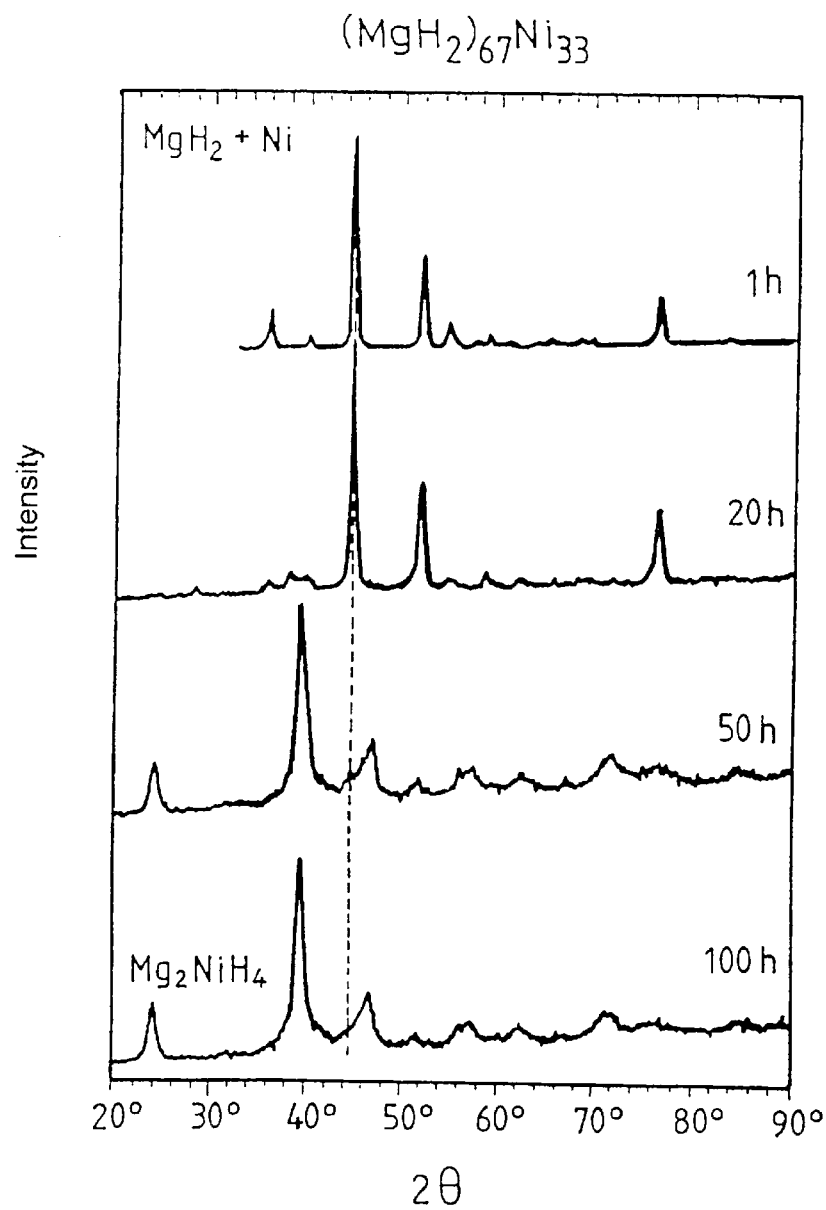
FIG. 6 shows the x-ray diffraction pattern of the $(MgH_2)_{67}Ni_{33}$ powder mixture after different grinding periods.

FIG. 6 shows the X-ray diffraction pattern of the powder obtained after different milling periods. The Bragg reflections of the starting material decrease continuously as the milling period increases, which is illustrated by the dashed line. The formation of the $Mg_2NiH_4$ hydride phase is already recognizable after milling for 20 hours. The reaction is complete after 50 hours, and the structure of the hydride obtained remains unchanged even after further milling.

EXAMPLE 5

Synthesis of a $Mg_2NiH_4/MgH_2(Mg_{83}Ni_{17})$ mixture using $MgH_2$

Experimental details: $MgH_2$ powder and elemental Ni powder were mixed in a molar ratio 5:1. 40 g of this powder mixture was milled in a planetary ball mill (type Fritsch P5) at 230 rpm, using a hardened chrome steel vial (with a volume of 250 ml) and balls (with a diameter of 10 mm). A ball to powder weight ratio of 10:1 was chosen. The milling experiments were carried out in an argon atmosphere for up to 200 hours.

Figure 7:
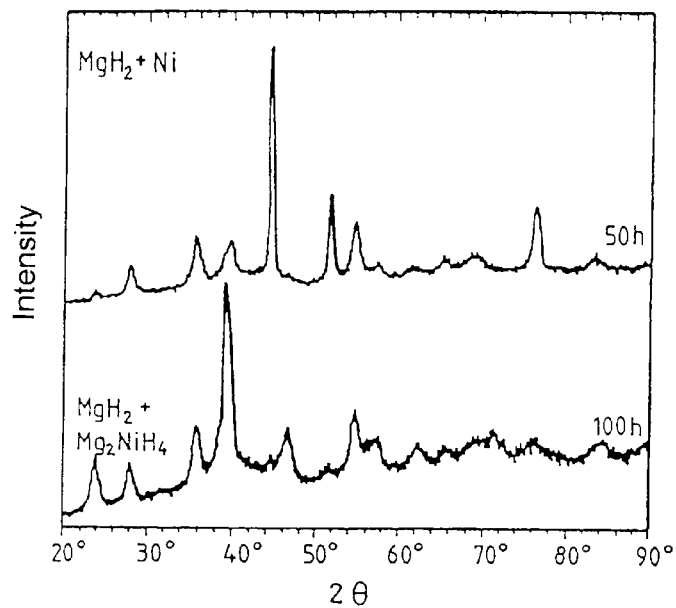
FIG. 7 shows the x-ray diffraction pattern of the $Mg_2NiH_4/MgH_2$ powder mixture after different grinding periods.

FIG. 7 shows the X-ray diffraction pattern of the powder after different milling durations. The Bragg reflections of the starting materials decrease with increasing milling duration After 100 hours of milling, the Ni peaks have disappeared and the $Mg_2NiH_4$ hydride has been formed. In this way an $Mg_2NiH_4/MgH_2$ two-phase hydride has been formed. The structure of the two-phase composite hydride remains unaltered even after further milling.

Figure 8:
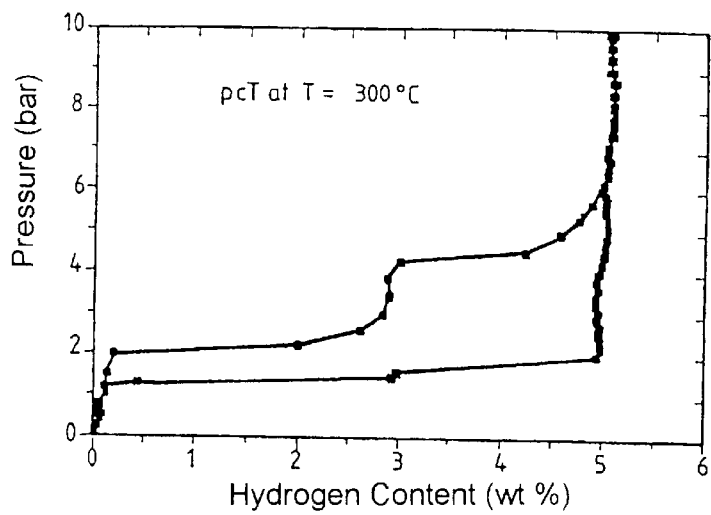
FIG. 8 shows the PCT diagram of the $Mg_2NiH_4/MgH_2$ two-phase composite powder.

FIG. 8 shows the PCT (Pressure-Concentration-Temperature) diagram of the composite. The two-pressure plateus, which relates to the formation of $Mg_2NiH_4$ and $MgH_2$, can be clearly distinguished and/or kept separate. The total hydrogen capacity of the hydride is 5% wt./wt.

EXAMPLE 6

Synthesis of $Mg_2NiH_{0.3}/Mg_2Ni$ Hydride Using 10 Mol % $MgH_2$ and 90 Mol % Mg Experimental details: Mg powder and $MgH_2$ are mixed in a molar ratio of 9:1. Thereafter this mixture is mixed with elemental Ni powder in a molar ratio of 2:1. 40 g of the powder mixture are milled in a planetary ball mill (type Fritsch P5) at 230 rpm, using a hardened chrome steel vial (with a volume of 250 ml) and balls (with a diameter of 10 mm). A ball to powder weight ratio of 10:1 was chosen. The milling experiments were carried out in an argon atmosphere for up to 200 hours.

Figure 9:
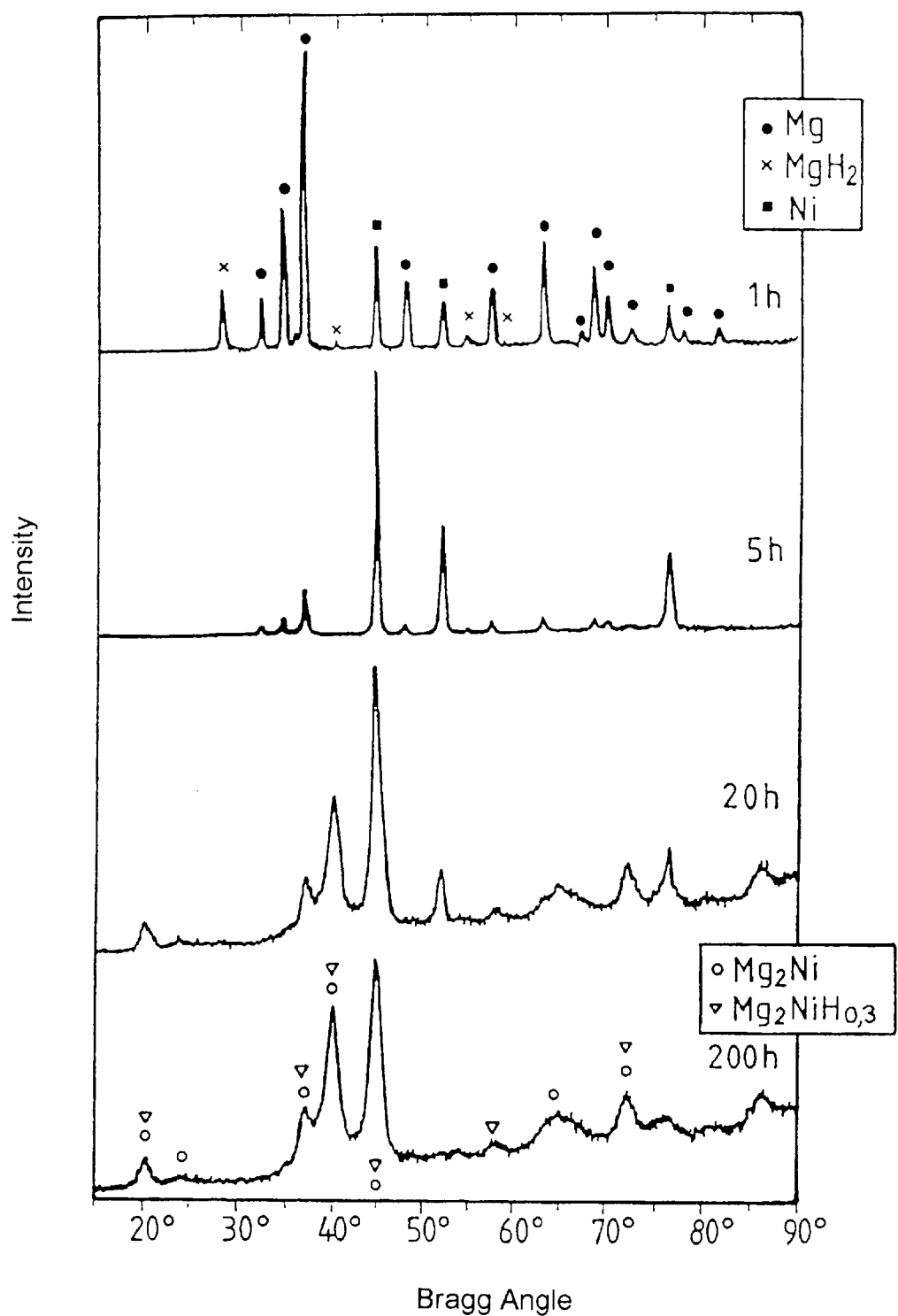
FIG. 9 shows the x-ray diffraction pattern of the (Mg-10 mol % $MgH_2)_{67}Ni_{33}$-powder mixture with different grinding periods.

FIG. 9 shows an X-ray diffraction pattern of the hydride for different milling times. The Bragg reflections of the $MgH_2$ have almost disappeared after only 5 hours of milling. After a milling time of 20 hours, the Ni peaks heave also significantly decreased and new phases have formed. Finally, Ni diffraction peaks are no longer visible after 200 hours of milling and an $Mg_2NiH_{0.3}/Mg_2Ni$ two-phase hydride is obtained.

Figure 10:
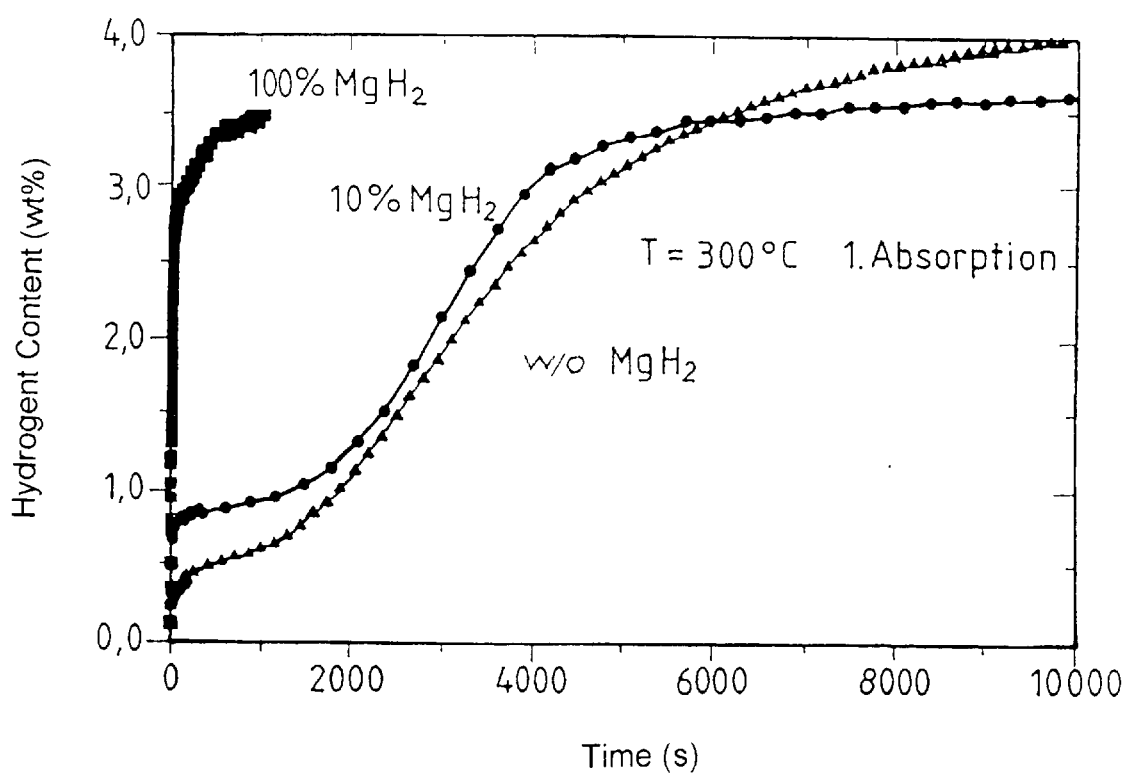
FIG. 10 shows a comparison of the hydrogen absorption kinetics at 300° C. for $Mg_2Ni$, calculated with different values of $MgH_2$.

The kinetic properties of the material described in Examples 4 and 6 during the first absorption cycle (after the initial desorption) are compared with the properties of $Mg_2Ni$ manufactured from the pure materials, cf. FIG. 10. Whilst the $Mg_2NiH_{0.3}/Mg_2Ni$ two-phase mixture represents merely a minimal improvement with regard to the material that had been milled without $MgH_2$, the $Mg_2NiH_4$, that was milled with 100% $MgH_2$ is clearly the better one, and achieves up to 80% of the total hydrogen absorption capacity within 20 seconds.

What is claimed is:

1. A process for manufacturing nanocrystalline metal hydrides, comprising the step of subjecting a first metal hydride to a mechanical milling process with at least one metal and optionally a second metal hydride to produce an alloy hydride.

2. A process according to claim 1, wherein the milling process is carried out for a pre-determined period of time of up to 200 hours.

3. A process according to claim 1, wherein the milling process takes place in an inert gas atmosphere.

4. A process according to claim 3, wherein the inert gas is argon.

5. A process according to claim 1, wherein the first metal hydride is selected from the group consisting of Li, Na, K, Mg, Ca, Sc, Y, Ti, Zr, V, Nb and La.

6. A process according to claim 1, wherein the metal consists of at least one selected from the group consisting of Fe, Co, Ni, Cu, Zn, Al and Si.

7. A process according to claim 1, wherein the second metal hydride consists of a mixture of at least two elements selected from the group consisting of Li, Na, K, Mg, Ca, Sc, Y, Ti, Zr, V, Nb and La.

8. A process according claim 1, wherein at least one of the metal hydrides and the metal are supplied to the milling process in the form of powder.

* * * * *

UNITED STATES PATENT AND TRADEMARK OFFICE
CERTIFICATE OF CORRECTION

PATENT NO.     : 6,387,152 B1                                      Page 1 of 1
DATED          : May 14, 2002
INVENTOR(S)    : Thomas Klassen et al.

It is certified that error appears in the above-identified patent and that said Letters Patent is hereby corrected as shown below:

<u>Title page,</u>
Item [75], after "all of (DE)", insert -- Robert Schulz and Jacques Huot, both of Quebec, Canada --
Item [73], after "Geesthacht (DE)", add -- GFE Metalle and Materialien GmbH, Nürnberg (DE); and Hydro Quebec, Quebec (CA) --

Signed and Sealed this

Eighth Day of April, 2003

JAMES E. ROGAN
*Director of the United States Patent and Trademark Office*